(12) United States Patent
Iturbe Desentis et al.

(10) Patent No.: US 11,605,385 B2
(45) Date of Patent: Mar. 14, 2023

(54) PROJECT ISSUE TRACKING VIA AUTOMATED VOICE RECOGNITION

(71) Applicant: International Business Machines Corporation, Armonk, NY (US)

(72) Inventors: Ana Gabriela Iturbe Desentis, Jalisco (MX); Christof Schmitt, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 218 days.

(21) Appl. No.: 16/670,815

(22) Filed: Oct. 31, 2019

(65) Prior Publication Data

US 2021/0134296 A1     May 6, 2021

(51) Int. Cl.
| | |
|---|---|
| *G10L 15/22* | (2006.01) |
| *G06F 40/295* | (2020.01) |
| *H04L 65/4038* | (2022.01) |
| *G10L 15/26* | (2006.01) |
| *G06F 16/683* | (2019.01) |
| *G10L 15/18* | (2013.01) |
| *G10L 15/04* | (2013.01) |
| *G06F 40/279* | (2020.01) |

(52) U.S. Cl.
CPC ............ *G10L 15/26* (2013.01); *G06F 16/685* (2019.01); *G06F 40/279* (2020.01); *G10L 15/04* (2013.01); *G10L 15/1822* (2013.01)

(58) Field of Classification Search
CPC . G10L 15/1815; G10L 15/1822; G10L 15/22; G10L 15/26; G10L 25/63; G10L 2015/223; G10L 17/00; H04L 65/403; H04L 65/4038

USPC .................. 704/235, 246, 270, 275
See application file for complete search history.

(56) References Cited

U.S. PATENT DOCUMENTS

| | | | |
|---|---|---|---|
| 8,370,142 B2 | 2/2013 | Frankel et al. | |
| 8,626,847 B2 | 1/2014 | Jones et al. | |
| 9,710,819 B2 | 7/2017 | Cloran et al. | |
| 10,248,934 B1 * | 4/2019 | Shen .................. | G10L 15/26 |
| 10,424,297 B1 * | 9/2019 | Carino ................ | G10L 15/22 |
| 10,909,485 B2 * | 2/2021 | Kundu ............... | G06F 16/9538 |
| 2009/0296908 A1 * | 12/2009 | Lee .................... | G10L 15/26 |
| | | | 379/202.01 |
| 2010/0169499 A1 * | 7/2010 | Ristock .............. | H04L 65/4038 |
| | | | 370/352 |
| 2011/0270609 A1 | 11/2011 | Jones et al. | |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Martin Lerner
(74) *Attorney, Agent, or Firm* — Jared L. Montanaro (57) ABSTRACT

A processor may receive information from one or more users. The information may include identifiers associated with the one or more users and audio associated with the one or more users. The processor may transcribe the audio into a text of the audio. The processor may parse the text into one or more segments. The processor may analyze each of the one or more segments. The processor may determine, from the analyzing, a specific subject of the information.

13 Claims, 7 Drawing Sheets

(56) References Cited

U.S. PATENT DOCUMENTS

| | | | |
|---|---|---|---|
| 2013/0293666 A1* | 11/2013 | Jiang | H04L 65/4038 348/14.08 |
| 2013/0315107 A1* | 11/2013 | Lindner | H04L 65/4038 370/277 |
| 2015/0055513 A1* | 2/2015 | Houghton | H04L 65/80 370/260 |
| 2015/0117674 A1* | 4/2015 | Meachum | H04L 65/4038 381/94.1 |
| 2017/0102915 A1* | 4/2017 | Kusch | G10L 15/22 |
| 2017/0318260 A1* | 11/2017 | Torres | H04L 65/403 |
| 2018/0137856 A1* | 5/2018 | Gilbert | G10L 15/22 |
| 2018/0218734 A1* | 8/2018 | Somech | G10L 15/005 |
| 2019/0147875 A1* | 5/2019 | Stemmer | G10L 15/22 704/257 |
| 2019/0180175 A1* | 6/2019 | Meteer | G10L 15/26 |
| 2019/0189117 A1* | 6/2019 | Kumar | G10L 25/51 |
| 2019/0279619 A1* | 9/2019 | Krasadakis | G06F 40/30 |
| 2019/0287415 A1* | 9/2019 | Zavesky | G06F 40/30 |
| 2019/0392837 A1* | 12/2019 | Jung | G10L 15/22 |
| 2020/0236069 A1* | 7/2020 | Nowak-Przygodzki | G10L 15/22 |
| 2020/0342895 A1* | 10/2020 | Jung | G10L 15/26 |
| 2020/0358628 A1* | 11/2020 | Achyuth | G10L 17/00 |
| 2020/0403818 A1* | 12/2020 | Daredia | G10L 15/26 |
| 2021/0118432 A1* | 4/2021 | McCourt | G10L 15/22 |

OTHER PUBLICATIONS

Unknown, "Create Recording Transcripts in Cisco Webex Meetings, Events, and Training Sessions," https://help.webex.com/en-us/nk62t5eb/Create-Recording-Transcripts-in-Cisco-Webex-Meetings-Events-and-Training-Sessions, printed Aug. 6, 2019, 1 pg.

Unknown, "Enable real-time transcription and translation in Skype Meeting Broadcast," https://support.office.com/en-us/article/enable-real-time-transcription-and-translation-in-skype-meeting-broadcast-266efc46-325a-409d-8879-65c3123401dd, printed Aug. 6, 2019, 1 pg.

Unknown, "Nuance Transcription Engine—Voice to text software," https://www.nuance.com/omni-channel-customer-engagement/technologies/nuance-transcription-engine.html, printed Aug. 6, 2019, 2 pgs.

* cited by examiner

| Transcribed Text |
|---|
| Topic: Development |
| Speaker: Ricardo |
| The first agenda item is the update from the development team.<br><br>User [Work Item / story 1234] is the most critical one,<br><br>and that is blocked by [Work Item / defect 5678.]<br><br>Do we have an update on the defect status? |
| Speaker: Carlos |
| Yes, we found the cause of the problem and are implementing a fix now. |

PROJECT ISSUE TRACKING VIA AUTOMATED VOICE RECOGNITION

BACKGROUND

The present disclosure relates generally to the field of automated voice recognition, and more specifically to automatically identifying users of a conference call and automatically tracking defects of a project discussed during said conference call.

Large, distributed development teams typically coordinate their work through conference calls where status updates are discussed. The status updates usually detail work items, defects, and actions to take regarding said work items and/or defects, which are then tracked by issue tracking systems. In order to utilize the issue tracking systems, different development teams throughout the conference call must explicitly refer to individual defects or explicitly define actions to be taken on a specific part of a project. Lastly, once a defect or action has been taken care of, the issue tracking system must be manually updated, which is an error prone process where items can be forgotten.

SUMMARY

Embodiments of the present disclosure include a method, computer program product, and system for automatically identifying users of a conference call and automatically tracking defects of a project discussed during said conference call. A processor may receive information from one or more users. The information may include identifiers associated with the one or more users and audio associated with the one or more users. The processor may transcribe the audio into a text of the audio. The processor may parse the text into one or more segments. The processor may analyze each of the one or more segments. The processor may determine, from the analyzing, a specific subject of the information.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of automated voice recognition, and more specifically to automatically identifying users of a conference call and automatically tracking defects of a project discussed during said conference call. While the present disclosure is not necessarily limited to such applications, various aspects of the disclosure may be appreciated through a discussion of various examples using this context.

Large, distributed development teams typically coordinate their work through conference calls where status updates are discussed. The status updates usually detail work items, defects, and actions to take regarding said work items and/or defects, which are then tracked by issue tracking systems. In order to utilize the issue tracking systems, different development teams throughout the conference call must explicitly refer to individual defects or explicitly define actions to be taken on a specific part of a project. Lastly, once a defect or action has been taken care of, the issue tracking system must be manually updated, which is an error prone process where items can be forgotten.

Therefore, a voice recognition integrative automated system able to learn and act on work item issues may be desired by a user. A processor (e.g., in the voice recognition integrative automated system, of a cognitive engine, etc.) may receive information from one or more users. The information may include identifiers associated with the one or more users and audio associated with the one or more users. The processor may transcribe the audio into a text of the audio. The processor may parse the text into one or more segments. The processor may analyze each of the one or more segments. The processor may determine, from the analyzing, a specific subject of the information.

For example, a lead developer, using their laptop, may initiate a conference call with three other developers. The laptop may be running issue tracking software and ask the lead developer and each of the three other developers joining the conference call to vocally say their name and the part of the project each developer is working on. The issue tracking software is then able to know from the vocal affirmation whose voice belongs to who and which part of the project each developer is working on. The developers would then begin discussing the project and the issue tracking software would use a speech-to-text function that transcribes the discussion.

The issue tracking software would then parse the transcription into one or more segments (e.g., based on timed intervals [such as, every 5 seconds of transcription, etc.], or based on syntax [such as when a period in the transcription is detected, etc.]) and tag each segment with information associated with the developer who was discussing each segment (e.g., tag a segment as discussing part 1 of the project as developer 1 was talking about part 1, tag a second segment as discussing part 2 of the project as developer 2 was talking about part 2, etc.). The issue tracking software may parse the transcription in order to more easily analyze each of the one or more segments. From the segments, and the tags associated with each segment, the issue tracking system would determine which part of the project is being discussed (e.g., developer 1's part of the project, a defect of part 3 of the project, etc.).

In some embodiments, the processor may detect, from the information, an action trigger. The action trigger may indicate an action to be performed on the specific subject. The processor may display a prompt to a first user. The prompt may request that the user confirm the action. The processor may identify, from the prompt, that the user confirmed the action. The processor may tag, in response to the user confirmation of the action, the specific subject with an indicator. The indicator may indicate the action.

For example, the processor may determine that a developer that is a part of a conference call is discussing a first part of a project. The processor may further determine that the developer has indicated a defect within the first part of the project. The processor may then generate a prompt for a host of the conference call (e.g., or whoever has been designated the lead of the conference call, that is, the host does not have to have dominion over the conference call), which suggests that the defect should be addressed in subsequent conference calls. The host may confirm, by pressing an "accept" button on the prompt, that the defect should be addressed. The processor may tag the defect and save a record of the tag/defect in order for the host to address the progress of the defect during a subsequent conference call.

In some embodiments, the processor may suggest a solution to the defect. For example, the developer may identify the defect as a minor coding error and the processor may prompt the host with a suggestion to add a semicolon to the end of a coding line, etc.

In some embodiments, the processor may receive a second audio associated with one or more users. The processor may determine, from the second audio, that the specific subject is being discussed. The processor may identify that the specific subject is tagged with the indicator. The processor may determine if the action has been performed.

For example, an issue tracking system may be used for a first video conference chat and identify that the topic of the first video conference is in regard to the development of a product. Further, the issue tracking system may have marked an issue with the development of the product that needs to be addressed. One week later a second video conference chat may be initiated and the issue tracking system may identify from the discussion in the second video conference chat that the same product development of the first video conference is being discussed. The issue tracking system may then generate a prompt that is directed toward a user that was/is in-charge of addressing the marked issue. The prompt may ask the user if the issue has actually been addressed, and if so, the issue tracking system may unmark the issue and update a log associated with the development of the product indicating that the issue was resolved.

In some embodiments, the processor may identify that a first user is being directly communicated with over the audio. The processor may trigger, in response to the first user being directly communicated with, a response operation on a device used by the first user.

For example, a processor may identify that a host of a conference call is asking for input on product x. The processor may determine that caller x is associated with product x and send an alert to caller x's smartphone (e.g., sending a prompt, flash caller x's screen, making a chiming noise, etc.), indicating that they should respond to the host.

In some embodiments, the response operation may include unmuting the device used by the first user when the first device is muted while the first user is being directly communicated with over the audio. Following the example above, in addition to sending the alert to caller x's smartphone, the processor may unmute caller x's smartphone so that caller x can immediately respond to the host (e.g., in the case that caller x's smartphone was on mute or was automatically muted by the conference call software or the processor).

In some embodiments, when determining the specific subject of the information, the processor may utilize a cognitive engine to analyze the information, the audio, and the text. The processor may determine, from the cognitive engine, a context of the information, the audio, and the text. The processor may designate the context as being associated with the specific subject.

For example, two or more callers on a product update call may have forgotten to introduce the product that they are discussing. Issue tracking software on each of the callers' devices may begin analyzing the information associated with each caller (e.g., caller 1 is John who is a part of projects 1, 2, and 3; caller 2 is Joan who is the lead of projects 2 and 3, and caller 3 is Mark who is a part of project 2 and 4), the audio of the call (e.g., Joan: "what's going on with the project?", etc.), and the text of the audio (e.g., a transcription of the audio with tags indicating who said what). The issue tracking software may determine from the information, audio, and text that the callers may be talking about project 2, as it is the only project that all three callers are associated with and it would make the most sense for Joan to be asking about. After making the determinization that project 2 is being discussed, the issue tracking software may access a database with prior data associated with project 2 and determine if any needed actions have been taken in regard to project 2 or if any new actions are needed to be taken.

In some embodiments, the issue tracking software may determine, within a relative degree of certainty (e.g., within a threshold range, etc.) that the context is associated with the specific subject. For instance, following the example above, that the information, the audio, and the text combine to be above a 90% degree of certainty that project 2 is being discussed by the callers.

In some embodiments, when determining the context of the information, the audio, and the text, the processor may access a transcription database. The transcription database may include texts of prior audios associated with the specific subject. The processor may compare the one or more segments with the texts in the transcription database. The processor may determine, from the comparing, that at least one of the one or more segments is above a subject threshold. The processor may identify, from the audio, a tone of the at least one segment. The processor may group the at least one segment in a sub-group of the specific group.

For example, a processor may have determined that users on a conference call are discussing a previously discussed specific subject that is split into four parts (e.g., one development team in charge of product appearance, one development team on marketing, one development team on sales, and one development team on overhead costs). The processor may then access a database that was generated to correspond to the specific subject, and which includes prior audio and text associated with the specific subject. The processor may listen to the conference and analyze transcriptions of the conference call and determine from tone (e.g., "is the report done yet?", "great job," etc.) whether an issue has been resolved and/or needs to be resolved. Further, the processor may further tag and group each audio and text into a group that is associated with one of the four parts (e.g., if a developer for the product appearance is talking, the processor stores their audio and text of the audio in a sub-section of the database, which can be used in subsequent calls and/or to determine updates on their portion of the subject/project, etc.).

Figure 1A:
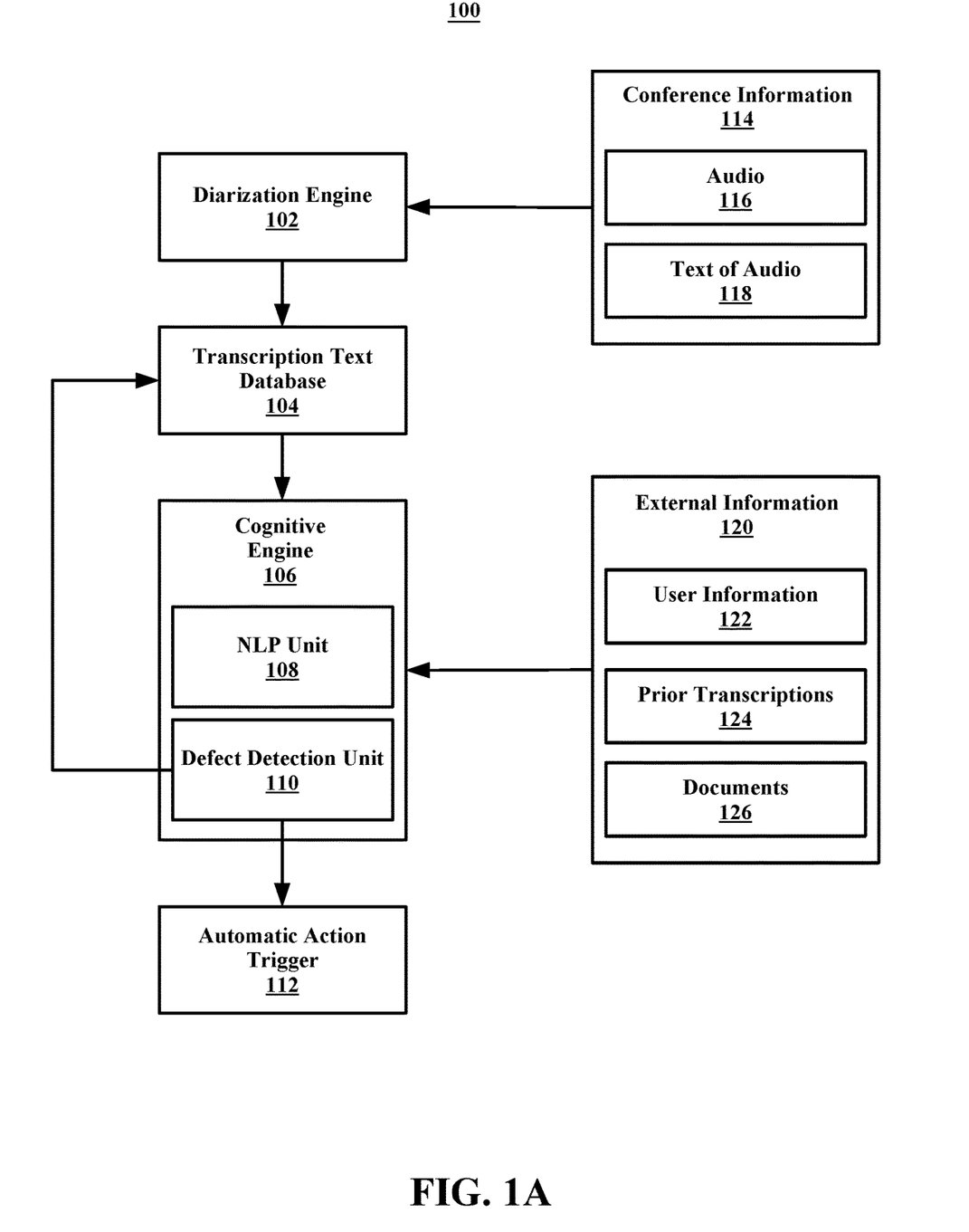
FIG. 1A illustrates an example system for determining an automatic action trigger based on an identified defect, in accordance with embodiments of the present disclosure.

Referring now to FIG. 1A, illustrated is an example system 100 for determining an automatic action trigger based on an identified defect, in accordance with embodiments of the present disclosure. In some embodiments, the system 100 includes an diarization engine 102, a transcription text database 104, a cognitive engine 106, an automatic action trigger 112, conference information 114, and external information 120. In some embodiments, the cognitive engine 106 includes an natural language processing (NLP) unit 108 and a defect detection unit 110. In some embodiments, the conference information 114 includes audio 116 and text of audio 118. In some embodiments, the external information 120 includes user information 112, prior transcriptions 124, and documents 126.

In some embodiments, the transcript text database 104 feeds the cognitive engine 106 with a newly transcribed text from the live call, which is provided via the diarization engine 102. The cognitive engine 106 performs an exploration in the transcribed text to find work items (e.g., the cognitive engine 106 utilizes the NLP unit 108 and defect detection unit 110 to identify a specific subject of the live call). In some embodiments the cognitive engine 106 receives input from different sources such as the user information 122, prior transcriptions 124, and documents 126 of the external information 120.

Further, in some embodiments, from the external information 120, the cognitive engine 106 is able to identify work items/specific subjects without a user explicitly stating (e.g., vocalizing) identifiers (e.g., case numbers, project names, etc.). This is done by the cognitive engine 106 using the identifiers from the external information 120 and learning the context of their usage via utilization of the NLP unit 108. When a work item is referred to in the conference call without explicitly mentioning the identifier, the learned contextual information will be used to identify the work item.

In some embodiments, pre-existing status documents listing the current agenda with work item numbers, or even prior transcriptions 124, from previous calls can be provided to the cognitive engine 106 before the live call. This allows the cognitive engine 106 to match a textual description of a work item during the live call to the exact identifier. Once the work item is recognized, the number/identifier is stored in the transcribed text database 104 and, at the same time, the automatic action trigger 112 is activated, which generates a flag (e.g., indicator, tag, etc.) that triggers next steps for the work item (e.g., a defect needs to be fixed, presenter two needs to now present, etc.).

In some embodiments, during the live (e.g., conference, web, etc.) call, the audio 116 and the text of audio 118 is transcribed continuously and then fed into the diarization engine 102. That diarization engine 102 will identify the speaker (e.g., user) based on previously stored speaker samples (which may be stored in under the user information 122 or in a separated speaker sample database that is not shown) and augment the transcribed text stream with the speaker's name and the speaker's team information. The augmented text stream is segmented and used to search the transcription text database 104. If there is a direct match for a work item based on a segment of the text stream, next steps for the work item are triggered via the automatic action trigger 112 (e.g., the defect detection unit 110 checks the transcription text database 104 and identifies if an action has been taken against a certain defect, the defect detection unit 110 adds a tag to the transcription text database 104 that indicates an action to be taken against a defect, etc.). If there is no direct match, the segment is fed into the cognitive engine 106, that tries to identify the work item(s) based on previously learned context. If the cognitive engine 106 determines there is a high-confidence match for a work item (e.g., above 75% on a scale of 0% to 100%, etc.), then next actions are triggered via the automatic action trigger 112. If the cognitive engine 106 determines there is a low-confidence match (e.g., at or below 5 on a scale of 1 to 10, etc.), then the work item from the match is looked up in the transcription text database 104, to determine if the confidence can be increased based on a textual match. Further, if a speaker, or speaker's team, matches the work item, then next steps are triggered via the automatic action trigger.

In some embodiments, the NLP unit 108 may be a computer module that analyzes the transcribed text and/or the external information 120. The NLP unit 108 may perform various methods and techniques for analyzing transcribed text and/or the external information 120 (e.g., syntactic analysis, semantic analysis, etc.). The NLP unit 108 may be configured to recognize and analyze any number of natural languages. In some embodiments, the NLP unit 108 may group one or more sections of the transcribed text and/or the external information 120 into one or more subdivisions. Further, the NLP unit 108 may include various modules to perform analyses of the transcribed text and/or the external information 120. These modules may include, but are not limited to, a tokenizer, a part-of-speech (POS) tagger (e.g., which may tag each of the one or more segments), a semantic relationship identifier, and a syntactic relationship identifier.

In some embodiments, the tokenizer may be a computer module that performs lexical analysis. The tokenizer may convert a sequence of characters (e.g., words, images, sounds, etc.) into a sequence of tokens. A token may be a string of characters included in the transcribed text and/or the external information 120 and categorized as a meaningful symbol. Further, in some embodiments, the tokenizer may identify word boundaries in the transcribed text and/or the external information 120 and break any text within the transcribed text and/or the external information 120 (e.g., from the live call, etc.) into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in the transcribed text and/or the external information 120 to correspond to a particular part of speech. The POS tagger may read a segment or other text in natural language and assign a part of speech to each word or other token of the segment. The POS tagger may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed transcribed text and/or the external information 120 (e.g., the content of one call may shed light on the meaning of one or more subjects in another call). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a recording with part of speech categories. In some embodiments, the POS tagger may tag tokens or words of the transcribed text and/or the external information 120 to be segmented.

In some embodiments, the semantic relationship identifier may be a computer module that may be configured to identify semantic relationships of recognized subjects (e.g., words, phrases, images, etc.) in the transcribed text and/or the external information 120. In some embodiments, the semantic relationship identifier may determine functional dependencies between entities and other semantic relationships.

Consistent with various embodiments, the syntactic relationship identifier may be a computer module that may be configured to identify syntactic relationships in the transcribed text and/or the external information 120 composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the NLP unit 108 may be a computer module that may group segments of the transcribed text and/or the external information 120 into subdivisions and generate corresponding data structures for one or more subdivisions of the transcribed text and/or the external information 120. For example, in response to receiving a the transcribed text and/or the external information 120, the NLP unit 108 may output subdivisions of the transcribed text and/or the external information 120 as data structures that indicate a sub-group of a specific group. In some embodiments, a subdivision may be represented in the form of a graph structure (e.g., a bipartite graph, etc.).

In some embodiments, the transcription text database 104 is the central engine that stores the transcribed text (e.g., the text of audio 118 of the live call and the text of prior audios of calls), together with detected metadata (e.g., a speaker of the text, areas of interest in regard to a sub-group, work items, etc.). This requires the ability of the transcription text database 104 to store a continuous stream of transcribed text for each call (e.g., live and prior) and later add the metadata to reference parts of that stream (e.g., tag each segment of text after the live call or with a delay of the live call [tag the text within 5 seconds of being spoken by a user and being transcribed]).

One possible implementation of the transcription text database 104 based on a relational database is breaking the incoming transcribed text into sentences and storing one sentence per row in a table. Metadata can be tracked in separate tables that reference the text rows through foreign keys (e.g., tokens, etc.). The transcription text database 104 schema would house tables of text and metadata as follows:

| Transcribed Text Database | |
|---|---|
| TextID | Text |
| 1 | The first agenda item is the update from the development team. |
| 2 | User story 1234 is the most critical one, and that is blocked by defect 5678. |
| 3 | Do we have an update on the defect status? |
| 4 | Yes, we found the cause of the problem and are implementing a fix now. |

| METADATA TABLE 1 | |
|---|---|
| Speaker | ReferenceToTextID |
| Ricardo | 1 |
| Ricardo | 2 |
| Ricardo | 3 |
| Carlos | 4 |

| METADATA TABLE 2 | |
|---|---|
| Topic | ReferenceToTextID |
| Development | 1 |
| Development | 2 |
| Development | 3 |
| Development | 4 |

| METADATA TABLE 3 | |
|---|---|
| Work Item | ReferenceToTextID |
| Story1234 | 2 |
| Defect5678 | 2 |

In some embodiments, an optimized version 150 of the transcription text database 104 may be used by the system 100. The optimized version 150 of the transcription text database 104 allows attaching structured metadata to a continuous stream of text, which allows for more efficient storage of data and more precise references to transcribed text. The optimized version 150 of the transcription text database 104 may look as what is presented in FIG. 1B.

Figure 1B:
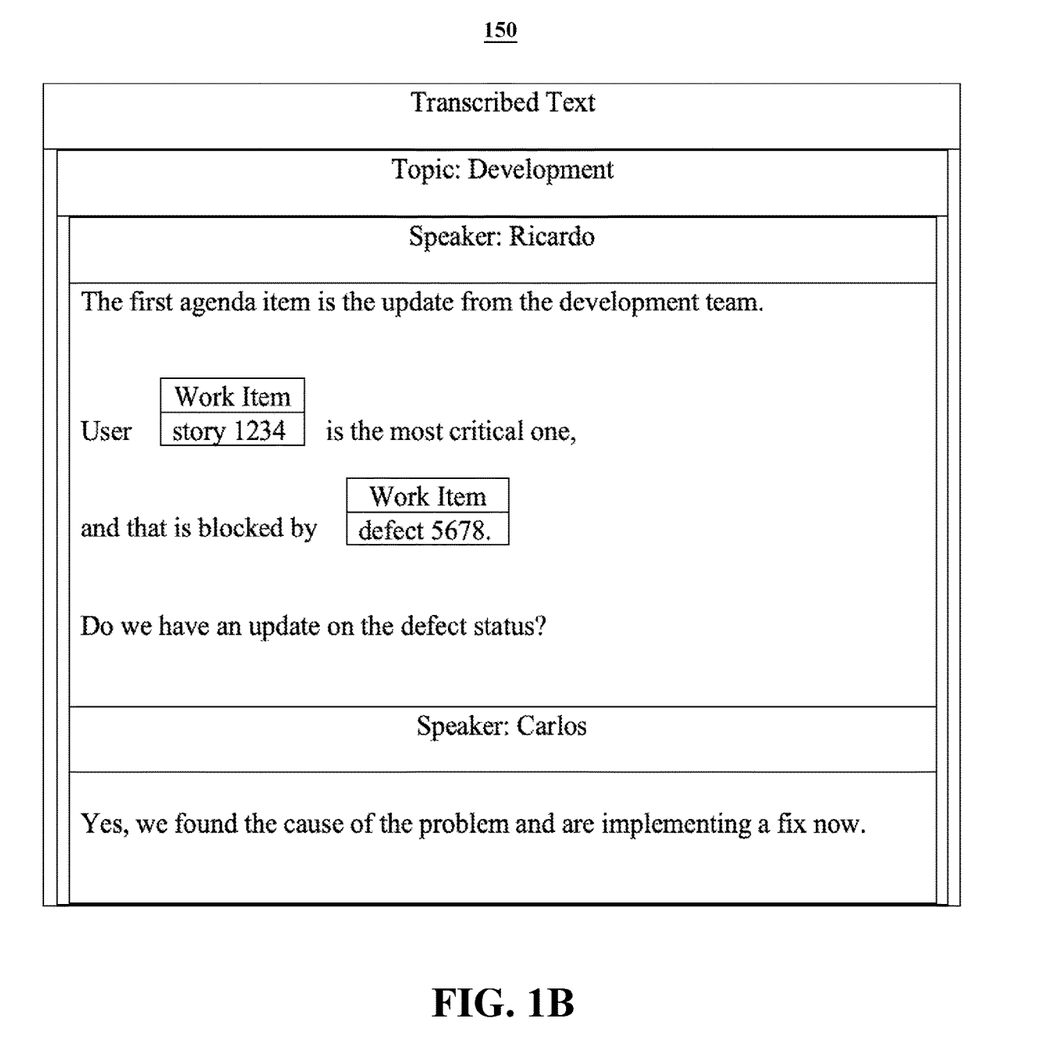
FIG. 1B illustrates an example of an optimized version of a transcription text database, in accordance with embodiments of the present disclosure.

That is, the optimized version 150 of the transcription text database 104 is a fully transcribed version of a live conversation and/or prior conversations, where, as depicted, the entire topic of the conversation is about development of a project, the first three lines of the conversation are tagged as belonging to Ricardo, and the last line of the conversation is tagged as belonging to Carlos. Further, the specific subjects/work items of the live conversation are found within the second line of the live conversation and are embedded with an indicator/metadata to depicted so.

Figure 2:
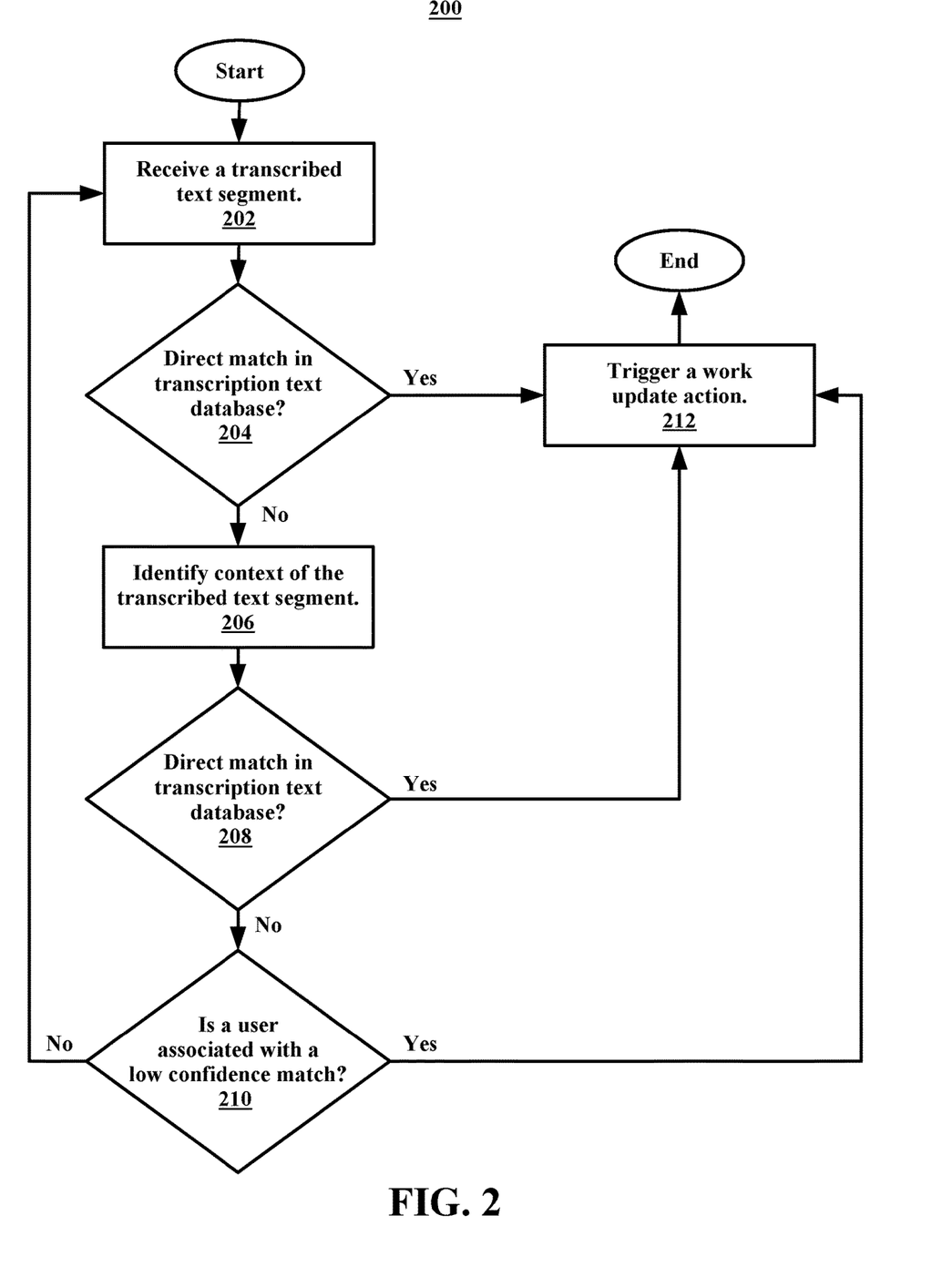
FIG. 2 illustrates a flowchart of an example method for a cognitive engine to determine an automatic action trigger, in accordance with embodiments of the present disclosure.

Referring now to FIG. 2, illustrated is a flowchart of an example method 200 for a cognitive engine to determine an automatic action trigger, in accordance with embodiments of the present disclosure. In some embodiments, the cognitive engine and the automatic action trigger discussed in regard to FIG. 2 are respectively the cognitive engine 106 and the automatic action trigger 112 of FIG. 1A. In some embodiments, the method 200 is performed by a processor of the cognitive engine 106.

In some embodiments, the method 200 begins at operation 202 where the processor receives a transcribed text segment. For example, when a host of a conference call schedules the call, additional information can be provided such as the host speaking the name of the project to be discussed. The host's speech will be transcribed into text and will be used to train a machine learning aspect of the cognitive engine 106. It is noted, that for each explicitly identified work item (e.g., "development update 1234"), the context of the text will be learned, so that the context can be used later to identify the work item during the conference call.

As such, the method 200 proceeds to decision block 204. At decision block 204 it is determined whether there is a direct match of the transcribed text segment in the transcription text database 104. If, at decision block 204, it is determined that the there is a direct match, the method 200 proceeds to operation 212 where the processor triggers a work update action (e.g., user is unmuted, a user is prompted to confirm an action, etc.).

In some embodiments, to help the processor identify relevant work items, the user is allowed to register areas of interest and specific work items. When one of those work items are directly recognized by the processor the following triggered actions may performed, e.g., highlight the text with the relevant work item on a user's screen; play an alarm sound to notify a user; if the audio volume of the call was previously set too low for a user, raise the volume; if a user set his phone to mute, the user's phone is unmuted. In some embodiments, any or some of the above listed actions could be performed simultaneously with instances when a user's name is recognized in the transcribed text segment. In some embodiments, after operation 212, the method 200 ends.

In some embodiments, if, at decision block 204, it is determined that there is no direct match, the method 200 proceeds to operation 206. At operation 206 the processor identifies the context of the transcribed text segment (e.g., a project with a typographical error, a project dealing with code, etc.). In some embodiments, the method 200 proceeds to decision block 208, where it is determined whether there is a direct match of the context of the transcribed text segment in the transcription text database 104.

If, at decision block 208, it is determined that there is a direct match (e.g., user 1 is only a part of one coding project, therefore they must be discussing said project, a high confidence match, etc.), the method 200 proceeds to operation 212, where the processor triggers a work update action. In some embodiments, the method 200 ends.

If, at decision block 208, it is determined that there is no direct match, the method 200 proceeds to decision block 210. At decision block 210, it is determined if a user is associated with a low confidence match as it is associated with the transcribed text segment and the context of the transcribed text segment.

If, at decision block 210, it is determined that the user is associated with a low confidence match, the method 200 proceeds to operation 212 where the processor triggers a work update action. For instance, if the user is associated with three projects and it is ambiguous from the transcribed text segment of the live conversation, the processor may have a low confidence as to which project is being referred to. However, if the processor identifies that the user makes mention of a "final stage" of a product, the processor can determine from context that only one product could be at a final stage of development, which would raise the processor's confidence in identifying which of the three projects is being discussed.

In some embodiments, the work update action includes the transcribed text segment of the relevant work being captured and automatically added into a work item as an update from the call (which may be added to the transcription text database 104); further the input is marked separately from regular updates (e.g., in a new tab), or as with a special comment (e.g., "ADDED FROM CONFERENCE CALL {DATE}").

In some embodiments, the work update action is an automatic action search that is executed. For instance, the cognitive engine 106 detects an action that should be performed based on the transcribed text segment. A confirmation window is displayed on a user's screen with the action (e.g., "close work item") is recognized by the cognitive engine 106. The user is asked to confirm or deny the action. Over time, the cognitive engine 106 will learn which items are relevant for the user to perform an action. Once the user confirms the action, a special comment will be added to indicate the performed action (e.g., "{OPEN/CLOSE} ACTION TRIGGER FROM CONFERENCE CALL {DATE}").

If, at decision block 210, it is determined that the user is not associated with a low confidence match, the method 200 proceeds back to operation 202 where a new transcribed text segment is received. In some embodiments, the method 200 is automatically repeated until a direct match and/or a high confidence is achieved in regard to the transcribed text segment and the discussed work project/subject/etc.

Figure 3:
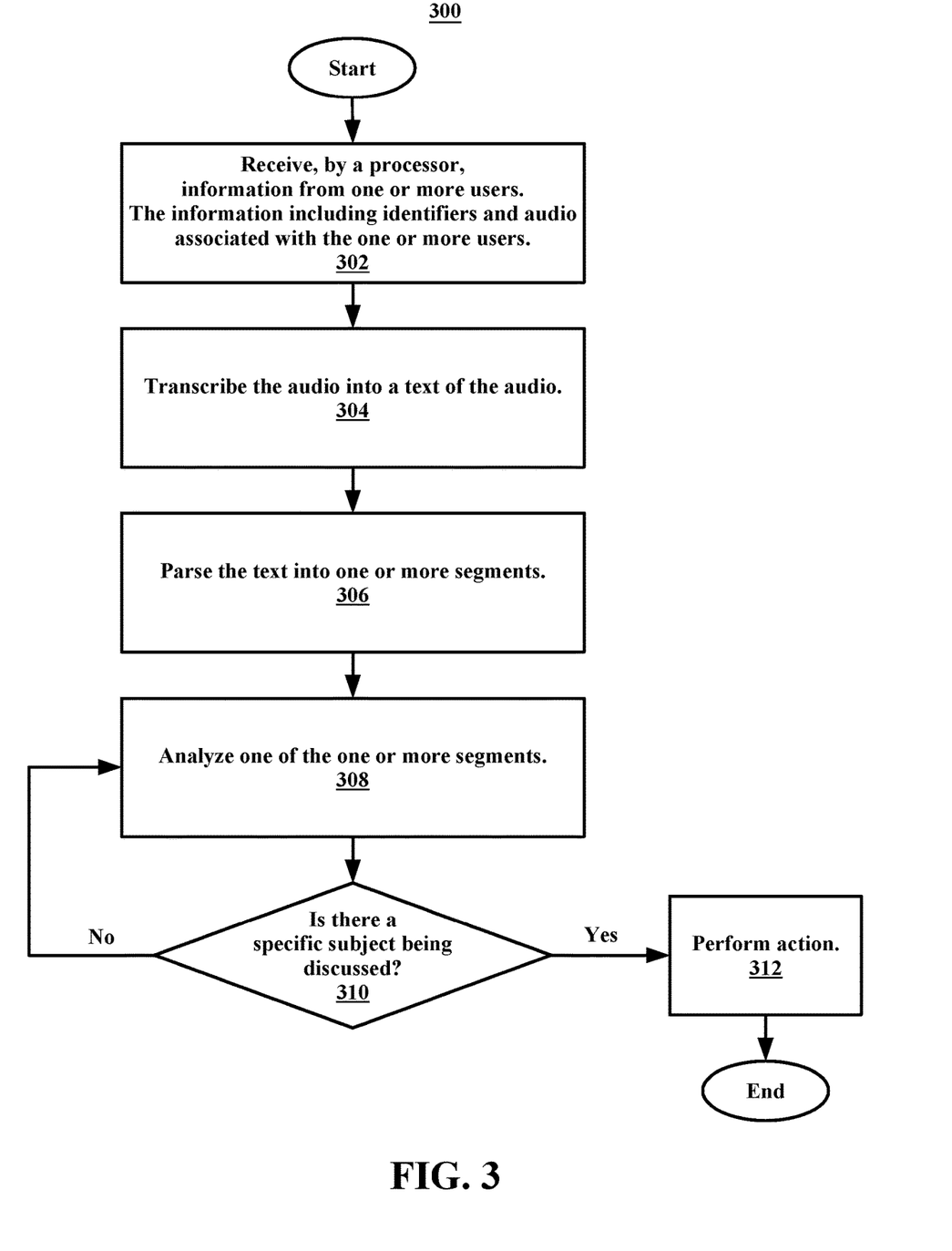
FIG. 3 illustrates a flowchart of an example method for determining a specific subject from information, in accordance with embodiments of the present disclosure.

Referring now to FIG. 3, illustrated is a flowchart of an example method 300 for determining a specific subject from information, in accordance with embodiments of the present disclosure. In some embodiments, the method 300 is performed by the system 100 and/or a processor included in the system 100 of FIG. 1A.

In some embodiments, the method 300 begins at operation 302. At operation 302, the processor receives information from one or more users. The information includes identifiers (e.g., the users' names, project tags, etc.) and audio associated with the one or more users (e.g., a voice sample for voice recognition, a recording of a live call, etc.). The method 300 proceeds to operation 304.

At operation 304, the processor transcribes the audio to a text of the audio. The method 300 proceeds to operation 306, where the processor parses the text into one or more segments. The method 300 proceeds to operation 308, where the processor analyzes one of the one or more segments.

The method 300 proceeds to decision block 310, where it is determined if there is a specific subject being discussed (by the one or more users) in the one analyzed segment. If, at decision block 310, it is determined that there is a specific subject being discussed, the method 300 proceeds to operation 312. At operation 312, the processor performs an action in regard to the specific subject. In some embodiments, the method 300 ends.

If, at decision block 310, it is determined that there is no specific subject being discussed (e.g., the transcribed text segment is pleasantries ["Hi," "How are you?, etc."], etc.), the method 300 proceeds back to operation 308, where another segment is analyzed. In some embodiments, the method 300 automatically repeats operation 308 and decision block 310 until a specific subject is identified.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
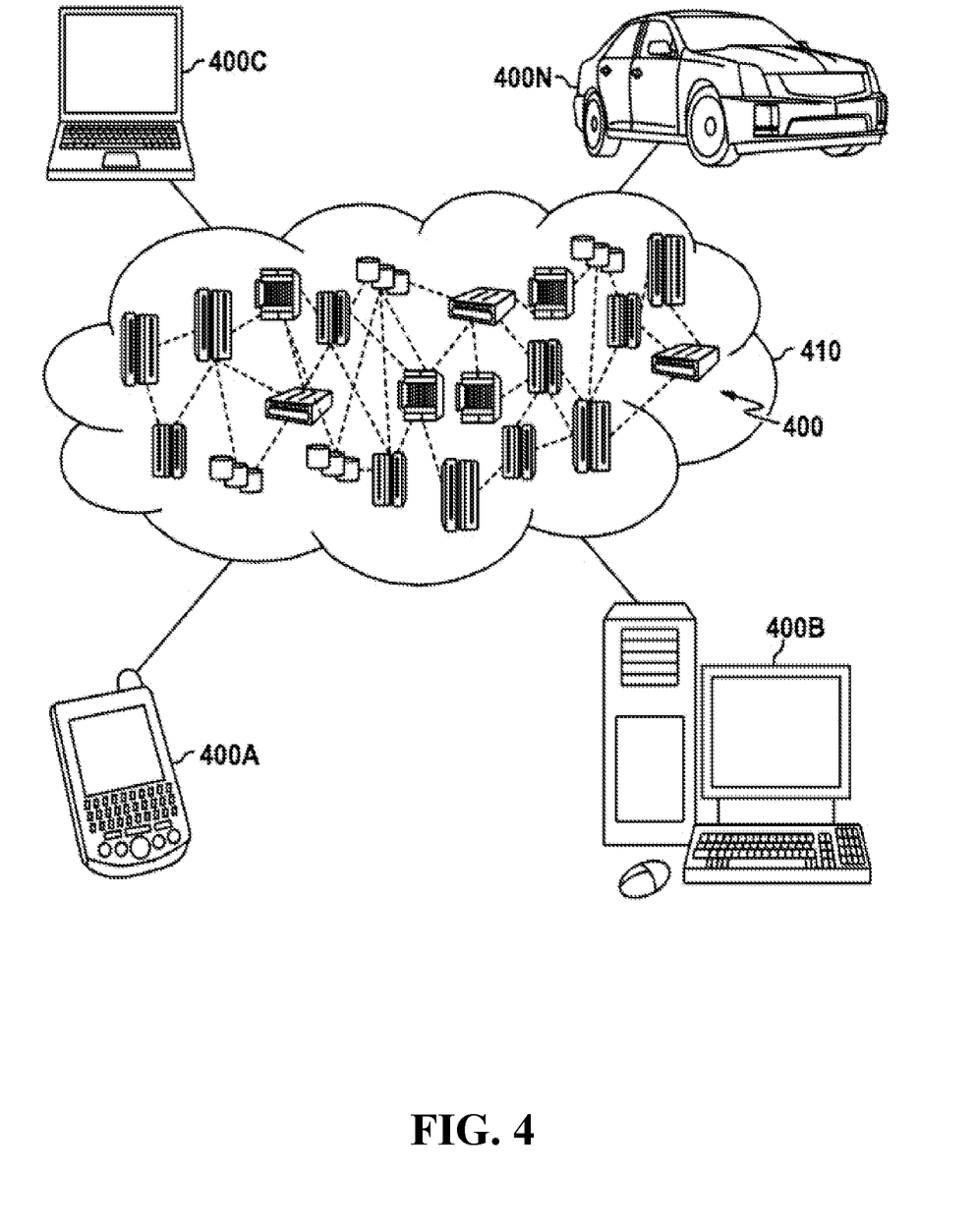
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
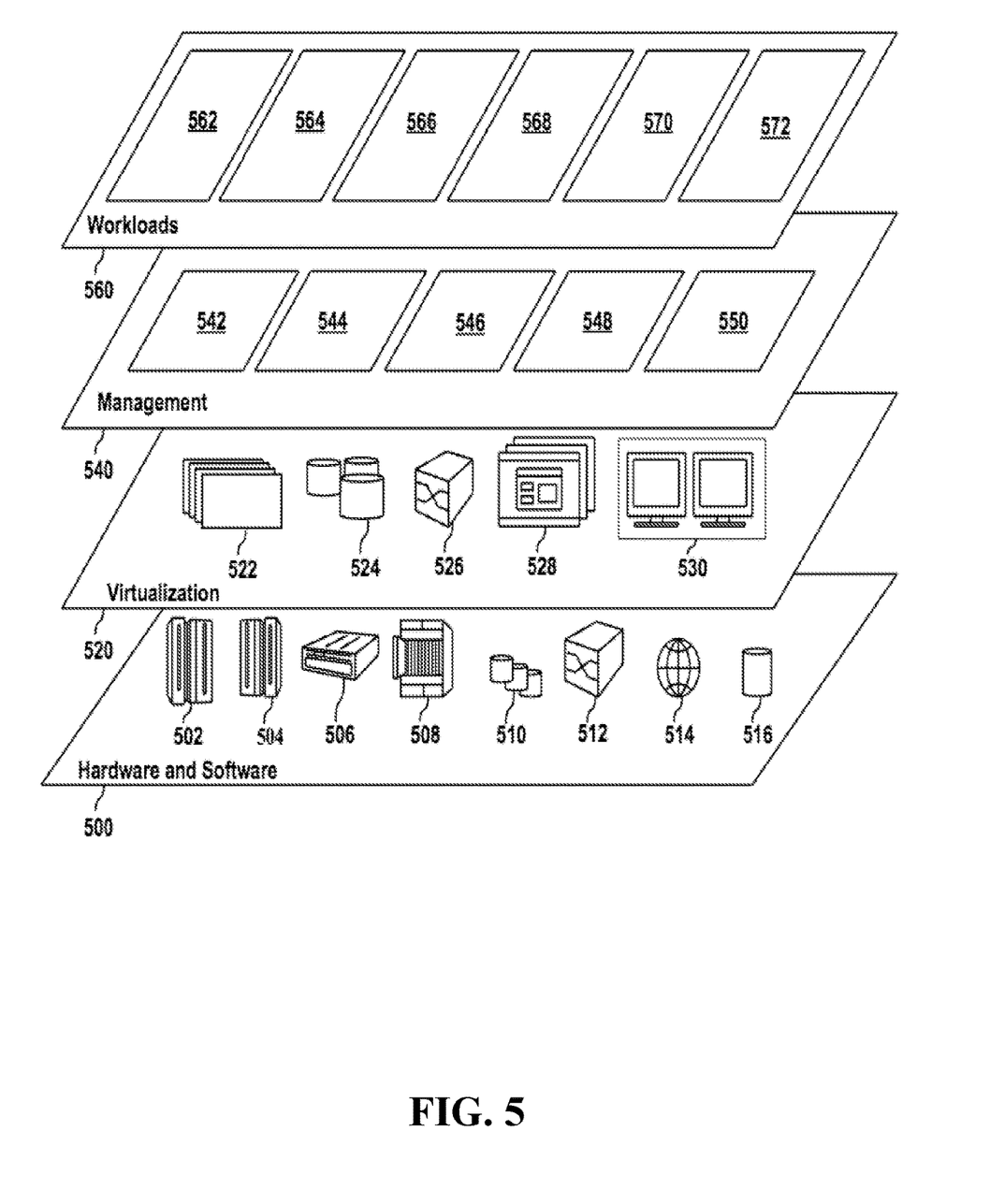
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and action processing 572.

Figure 6:
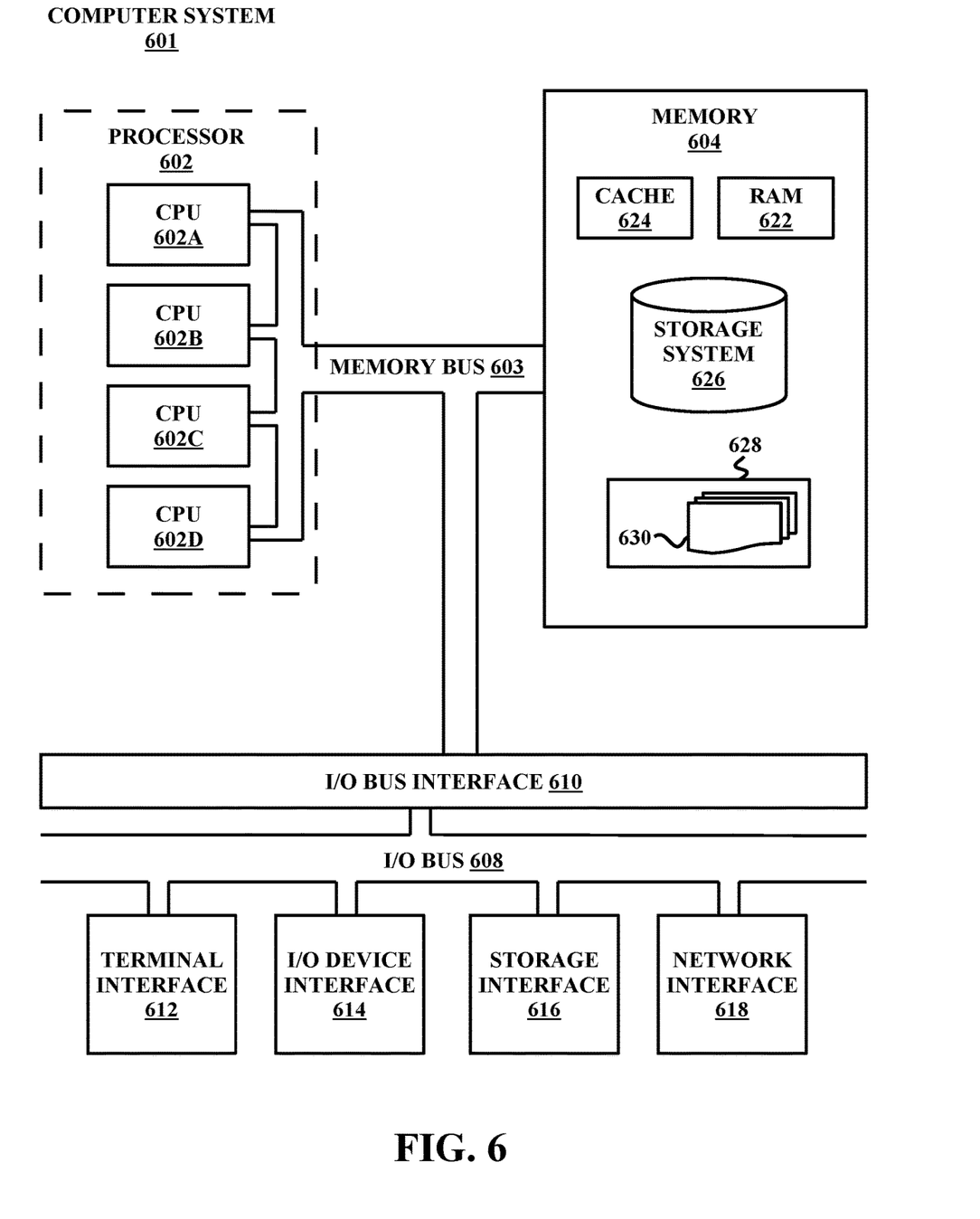
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
receiving, by a processor, information from one or more users, wherein the information includes identifiers associated with the one or more users and audio associated with the one or more users, and wherein at least one identifier of the identifiers associated with the one or more users includes a respective indication of one or more projects each of the one or more users is associated, wherein the respective indication includes a vocal affirmation by each of the one or more users;
transcribing the audio into a text of the audio;
parsing the text into one or more segments, wherein parsing the text into the one or more segments is based on syntax of the one or more segments;
tagging each of the one or more segments with an indicator of a user associated with each of the one or more segments;
analyzing each of the one or more segments;
determining, from the analyzing, a specific subject of the information,
identifying that a first user is being directly communicated with over the audio; and
triggering, in response to the first user being directly communicated with, a response operation on a device used by the first user:
wherein the response operation includes automatically unmuting the device used by the first user when the first device is muted while the first user is being directly communicated with over the audio by a second user, and
wherein the response operation further includes flashing a display on a device associated with the first user.

2. The method of claim 1, further comprising:
detecting, from the information, an action trigger, wherein the action trigger indicates an action to be performed on the specific subject;
displaying a prompt to a first user, wherein the prompt requests that the user confirm the action;
identify, from the prompt, that the user confirmed the action; and
tagging, in response to the user confirmation of the action, the specific subject with an indicator, wherein the indicator indicates the action.

3. The method of claim 2, further comprising:
receiving a second audio associated with the one or more users;
determining, from the second audio, that the specific subject is being discussed;
identifying that the specific subject is tagged with the indicator; and
determining if the action has been performed.

4. The method of claim 1, wherein determining the specific subject of the information comprises:
utilizing a cognitive engine to analyze the information, the audio, and the text;
determining, from the cognitive engine, a context of the information, the audio, and the text; and
designating the context as being associated with the specific subject.

5. The method of claim 1, wherein the specific subject of the information is an issue associated with a shared project of the one or more users, and wherein the method further comprises:
analyzing each respective indication;
identifying the shared project of the one or more users;
accessing a database that stores issue information associated with shared project; and
providing an indication of the issue associated with the shared project to each of the one or more users.

6. A system comprising:
a memory; and
a processor in communication with the memory, the processor executing instructions contained within the memory in order to perform operations comprising:
receiving information from one or more users, wherein the information includes identifiers associated with the one or more users and audio associated with the one or more users, and wherein at least one identifier of the identifiers associated with the one or more users includes a respective indication of one or more projects each of the one or more users is associated, wherein the respective indication includes a vocal affirmation by each of the one or more users;
transcribing the audio into a text of the audio;
parsing the text into one or more segments, wherein parsing the text into the one or more segments is based on syntax of the one or more segments;
tagging each of the one or more segments with an indicator of a user associated with each of the one or more segments;
analyzing each of the one or more segments;
determining, from the analyzing, a specific subject of the information,
identifying that a first user is being directly communicated with over the audio; and
triggering, in response to the first user being directly communicated with, a response operation on a device used by the first user:
wherein the response operation includes automatically unmuting the device used by the first user when the first device is muted while the first user is being directly communicated with over the audio by a second user, and
wherein the response operation further includes flashing a display on a device associated with the first user.

7. The system of claim 6, wherein the operations further comprise:
detecting, from the information, an action trigger, wherein the action trigger indicates an action to be performed on the specific subject;
displaying a prompt to a first user, wherein the prompt requests that the user confirm the action;
identify, from the prompt, that the user confirmed the action; and
tagging, in response to the user confirmation of the action, the specific subject with an indicator, wherein the indicator indicates the action.

8. The system of claim 7, wherein the operations further comprise:
receiving a second audio associated with the one or more users;

determining, from the second audio, that the specific subject is being discussed;

identifying that the specific subject is tagged with the indicator; and determining if the action has been performed.

9. The system of claim 6, wherein determining the specific subject of the information comprises:

utilizing a cognitive engine to analyze the information, the audio, and the text;

determining, from the cognitive engine, a context of the information, the audio, and the text; and designating the context as being associated with the specific subject.

10. A computer program product comprising a computer readable storage medium having program instructions embodied therewith, the program instructions executable by a processor to cause the processor to perform a method, the method comprising:

receiving information from one or more users, wherein the information includes identifiers associated with the one or more users and audio associated with the one or more users, and wherein at least one identifier of the identifiers associated with the one or more users includes a respective indication of one or more projects each of the one or more users is associated, wherein the respective indication includes a vocal affirmation by each of the one or more users;

transcribing the audio into a text of the audio;

parsing the text into one or more segments, wherein parsing the text into the one or more segments is based on syntax of the one or more segments;

tagging each of the one or more segments with an indicator of a user associated with each of the one or more segments;

analyzing each of the one or more segments;

determining, from the analyzing, a specific subject of the information, identifying that a first user is being directly communicated with over the audio; and triggering, in response to the first user being directly communicated with, a response operation on a device used by the first user:

wherein the response operation includes automatically unmuting the device used by the first user when the first device is muted while the first user is being directly communicated with over the audio by a second user, and wherein the response operation further includes flashing a display on a device associated with the first user.

11. The computer program product of claim 10, further comprising:

detecting, from the information, an action trigger, wherein the action trigger indicates an action to be performed on the specific subject;

displaying a prompt to a first user, wherein the prompt requests that the user confirm the action;

identify, from the prompt, that the user confirmed the action; and tagging, in response to the user confirmation of the action, the specific subject with an indicator, wherein the indicator indicates the action.

12. The computer program product of claim 11, further comprising:

receiving a second audio associated with the one or more users;

determining, from the second audio, that the specific subject is being discussed;

identifying that the specific subject is tagged with the indicator; and determining if the action has been performed.

13. The computer program product of claim 10, wherein determining the specific subject of the information comprises:

utilizing a cognitive engine to analyze the information, the audio, and the text;

determining, from the cognitive engine, a context of the information, the audio, and the text; and designating the context as being associated with the specific subject.

* * * * *